US007642489B2

(12) United States Patent
Liu et al.

(10) Patent No.: US 7,642,489 B2
(45) Date of Patent: Jan. 5, 2010

(54) FLEXIBLE ELECTROTHERMAL COMPOSITE AND HEATING APPARATUS HAVING THE SAME

(75) Inventors: Chang-Hong Liu, Beijing (CN); Shou-Shan Fan, Beijing (CN)

(73) Assignees: Tsinghua University, Beijing (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 257 days.

(21) Appl. No.: 11/561,356

(22) Filed: Nov. 17, 2006

(65) Prior Publication Data

US 2007/0295714 A1 Dec. 27, 2007

(30) Foreign Application Priority Data

Jun. 16, 2006 (CN) ........................ 2006 1 0061170

(51) Int. Cl.
*H05B 3/02* (2006.01)
*B32B 5/16* (2006.01)

(52) U.S. Cl. ........................ 219/538; 219/552; 219/553; 428/323; 524/495

(58) Field of Classification Search ................. 219/538, 219/552-3; 428/323; 524/495
See application file for complete search history.

(56) References Cited

U.S. PATENT DOCUMENTS

| | | | | |
|---|---|---|---|---|
| 5,258,351 | A | 11/1993 | Satake | |
| 7,393,428 | B2 | 7/2008 | Huang et al. | |
| 2005/0148696 | A1 | 7/2005 | Hsiao et al. | |
| 2005/0170169 | A1 * | 8/2005 | Watanabe et al. | 428/323 |

* cited by examiner

*Primary Examiner*—Shawntina Fuqua
(74) *Attorney, Agent, or Firm*—Clifford O. Chi

(57) ABSTRACT

The present invention relates to a flexible electrothermal composite. In one embodiment, a flexible electrothermal composite includes a flexible polymer matrix and a number of carbon nanotubes dispersed in the matrix, the carbon nanotubes forming a plurality of conductive network in the polymer. The flexible electrothermal composite has high flexibility, resistance and intensity.

18 Claims, 4 Drawing Sheets

FLEXIBLE ELECTROTHERMAL COMPOSITE AND HEATING APPARATUS HAVING THE SAME

BACKGROUND

1. Technical Field

The present invention relates to electrothermal materials, and especially to flexible electrothermal composites containing carbon nanotubes.

2. Discussion of Related Art

Electrothermal materials can generate heat when a voltage is applied thereto. Usually electrothermal materials are made of metal, for example, tungsten filament. Metals have good conductivity which means they can generate a lot of heat even when a low voltage is applied, but such metals cannot be used in low temperature applications. Furthermore, most metals are rigid thus an electrothermal material that is made of a metal cannot vary its shape to fit the shape of an object that is contact with the electrothermal material. Both high resistance and high flexibility are needed in some applications such as for seat warmers, electric blankets, heated belts, immersion suits etc. Obviously, electrothermal materials that are made of metals don't meet this need.

In order to solve the aforementioned problem, an electrothermal material comprised of a polymer and a number conductive particles dispersed therein has been developed. The conductive particles can include metal powder or graphite powder. This type of electrothermal material has a relatively high flexibility and high resistance. However, in order to reach to an appropriate conductivity, a large amount of conductive particles need to be mixed with the electrothermal material. This inevitably significantly lowers mechanical strength of the electrothermal material. In addition, the lifetime of the electrothermal materials is reduced accordingly.

Therefore, there is a desire to develop an electrothermal material that has high flexibility, high resistance and high strength.

SUMMARY

In one embodiment, a flexible electrothermal composite includes a flexible polymer matrix and a number of carbon nanotubes dispersed in the matrix, the carbon nanotubes forming a number of conductive networks in the polymer matrix.

In another embodiment, a heating apparatus comprises a flexible electrothermal composite with a flexible polymer matrix, and a plurality of carbon nanotubes dispersed in the matrix. The carbon nanotubes cooperatively form an electrically conductive network in the flexible polymer matrix, with two leads each having a first end electrically connected with the flexible electrothermal composite and an opposite second end, configured for being electrically connected with the power supply.

This and other features and advantages of the present invention as well as the preferred embodiments thereof and a metal nanowire array and techniques for fabricating metal nanowire array in accordance with the invention will become apparent from the following detailed description and the descriptions of the drawings.

Figure 1:
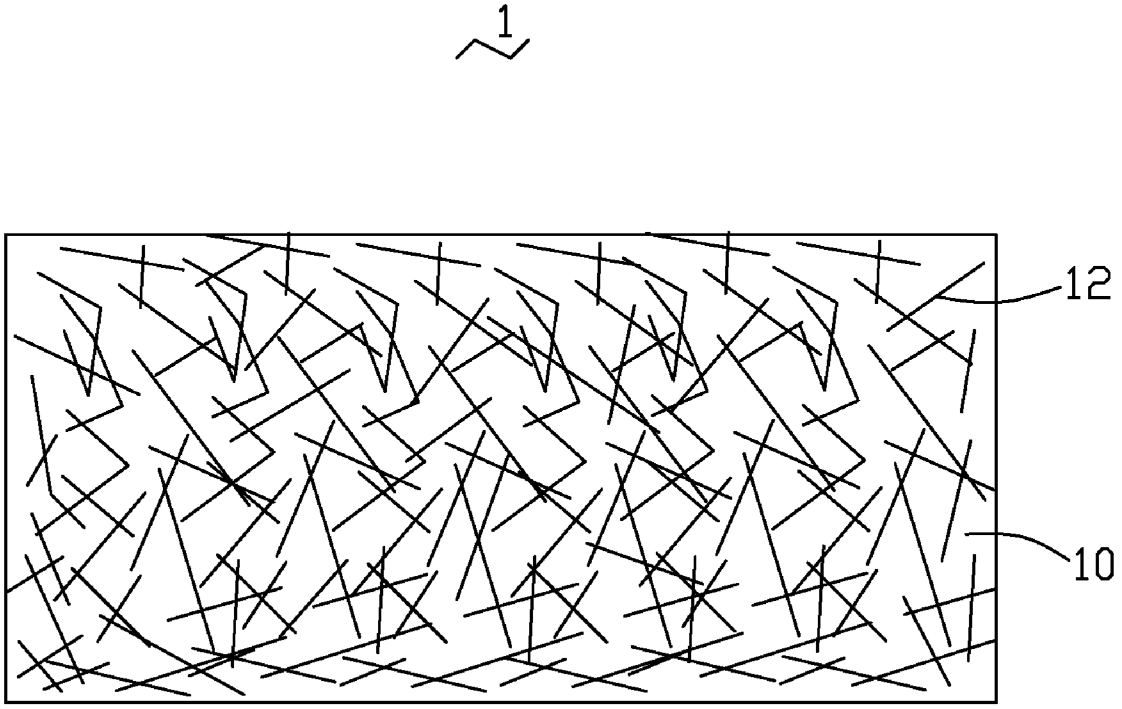
FIG. 1 is a cross sectional schematic view of a flexible electrothermal composite in accordance with a preferred embodiment.

Many aspects of the present composite and apparatus can be better understood with reference to the following drawings. The components in the drawings are not necessarily drawn to scale, the emphasis instead being placed upon clearly illustrating the principles of the present composite and apparatus.

DETAILED DESCRIPTION OF THE PREFERRED EMBODIMENTS

Referring to FIG. 1, a flexible electrothermal composite in accordance with a first embodiment includes a flexible polymer matrix 10 and a number of carbon nanotubes 12 randomly dispersed in the flexible polymer matrix 10. The carbon nanotubes 12 form a number of conductive networks in the flexible polymer matrix 10 thus the flexible electrothermal composite is conductive.

The flexible polymer matrix 10 can be selected from the group consisting of silicone elastomer, polyurethane, epoxy resin and combinations thereof. The carbon nanotubes 12 can be either single-walled nanotubes or multi-walled nanotubes. Preferably, a length of the carbon nanotubes 12 is in the range from 1 micrometer to 10 micrometers. Preferably, a percentage of the carbon nanotubes 12 by weight is in the range from 0.1% to 4%.

Figure 2:
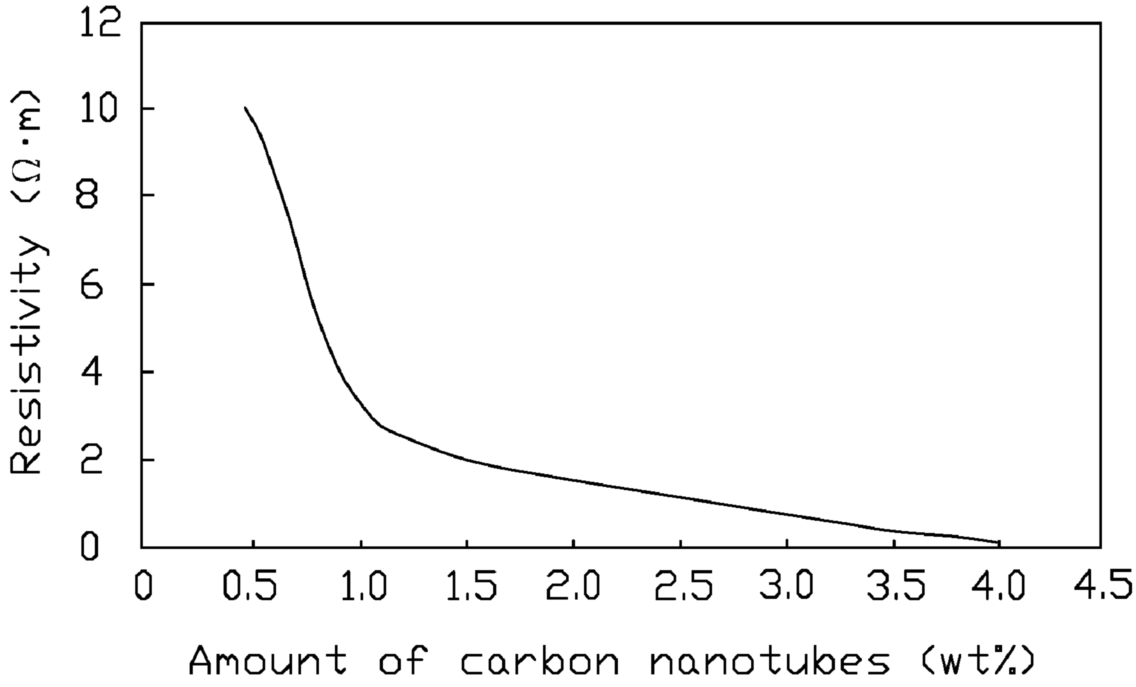
FIG. 2 is diagram showing a trendline of resistivity of the flexible electrothermal composite of FIG. 1 declining with an increase in the percentage of the carbon nanotubes.

Referring to FIG. 2, it shows a trendline of resistivity of the flexible electrothermal composite declining with an increase of the percentage in the carbon nanotubes 12. The carbon nanotubes 12 have an average length of about 5 micrometers. When the percentage of the carbon nanotubes 12 by weight is 0.4% the resistivity of the flexible electrothermal composite is about 10 Ω·m. When the percentage of the carbon nanotubes 12 by weight is 4% the resistivity of the flexible electrothermal composite is about 0.1 Ω·m. The resistivity of the flexible electrothermal composite is between 0.1 Ω·m to 10 Ω·m. The resistivity ensures that a low temperature can be obtained by the flexible electrothermal composite.

Preferably, an additive is dispersed in the flexible polymer matrix. The additive can be an antioxidant such as N,N'-diphenyl 1,4-phenylenediamine or a flame retardant such as chloroparaffin, chloro-cycloparaffin, tetrachlorophthalic anhydride, phosphate ester, halogen substituted phosphate ester and combinations thereof. The approximate percentage by weight of the flame retardant can be in the range from 1% to 10%.

The flexible electrothermal composite can generate heat at a low level. For example, if 36 volts is applied between two ends of a piece of this kind of electrothermal material having a size of 30 (length)×30 (width)×0.05 (height) centimeters, with carbon nanotubes constituting a percentage by weight of about 2.5% and with an average nanotube length of about 5 micrometers total power consumption should be less than one watt. The flexible electrothermal composite is suitable for use in low temperature heating apparatuses such as seat warmers, electric blankets, heated belts, immersion suits etc.

Compared with electrothermal materials that are comprised of metal or alloy, the flexible electrothermal composite in accordance with the first embodiment has the following advantages. First, the polymer matrix is flexible thus it can deform under external force and resiles when the external force is released. The polymer matrix is less toxic thus it is more suitable for use in a heating apparatus that comes into contact with the human body. The carbon nanotubes form a network in the matrix, the network can improve heat conductivity and intensity of the flexible electrothermal composite.

The flexible electrothermal composite in accordance with the first embodiment can be manufactured by following method, which comprises the steps of:

(a) preparing a solution of a polymer precursor;

(b) immersing carbon nanotubes in the solution and ultrasonically cleaning the solution; and (c) polymerizing and curing the polymer precursor with an initiator thus obtaining a flexible polymer with a number of carbon nanotubes dispersed therein.

In step (a), a solution of a polymer precursor is prepared. The polymer precursor generally includes a prepolymer or a monomer. The prepolymer can be selected from the group consisting of silicone elastomer prepolymer, polyurethane prepolymer, epoxy resin prepolymer and combination thereof.

In step (b), carbon nanotubes are immersed in the solution and ultrasonically cleaned. In the preferred embodiment, the carbon nanotubes can be formed by chemical vapor deposition, arch discharge, or laser ablation. The carbon nanotubes may include multi-walled nanotubes, single-walled nanotubes or a mixture thereof. Diameters of the carbon nanotubes are in the range from 1 to 10 micrometers.

In order to avoid the carbon nanotubes conglomerating with each other in the solution, step (b) preferably further includes the steps of: ultrasonically cleaning the solution for a few minutes; disturbing the solution by using an ultrasonic disturber to disperse the conglomerated carbon nanotubes; and ultrasonically cleaning the treated solution for a few minutes to uniformly disperse the carbon nanotubes therein. By means of the disturbing by the ultrasonic disturber and the ultrasonic cleaning, the carbon nanotubes can be effectively and uniformly dispersed.

Step (c) is to polymerize the polymer precursor with an initiator and to obtain a polymer matrix having carbon nanotubes uniformly dispersed therein. In the illustrated embodiment, the initiator includes a solution of ethanol or deionized water having component B of the polyurethane dispersed therein. The initiator is added in the solution of the prepolymer having component A of the polyurethane, in order to polymerize the polymer. A proportion by weight between the initiator and the prepolymer is preferably about 5:1. Then, after ultrasonically cleaning the mixture solution, sediment is collected. The sediment is a polymer matrix having carbon nanotubes therein. In the illustrated embodiment, the obtained polymer is a black grease material. The carbon nanotubes are uniformly dispersed therein.

Figure 3:
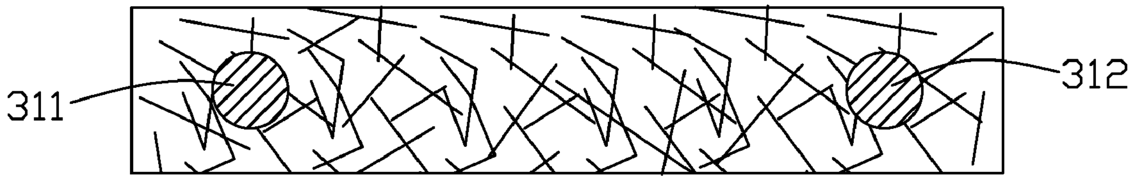
FIG. 3 is a cross sectional schematic view of a flexible electrothermal composite with two electrodes embedded therein.

Referring to FIG. 3, a first electrode 311 and a second electrode 312 should preferably be buried in the polymer before the prepolymer is cured. The first electrode 311 and the second electrode 312 can be made of copper or aluminium.

Figure 4:
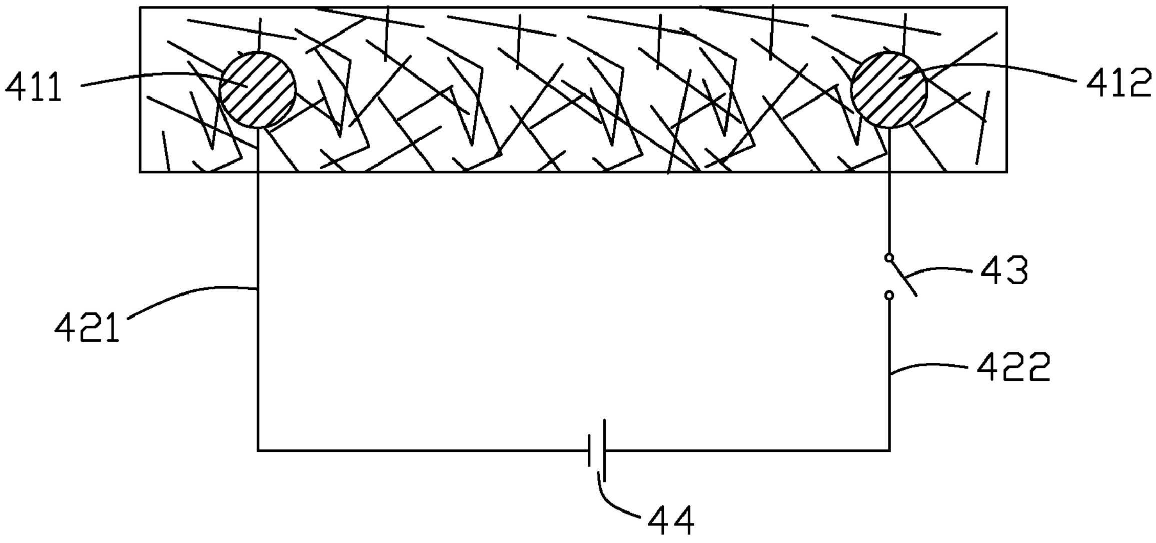
FIG. 4 is a schematic view of a heating apparatus having the flexible electrothermal composite of FIG. 3.

Referring to FIG. 4, a heating apparatus in accordance with a preferred embodiment includes a flexible electrothermal composite 41, a first lead 421, a second lead 422, a first electrode 411, a second electrode 412 and a switch 43. An end of each of the first electrode 411 and the second electrode 412 are buried in the flexible electrothermal composite 41. The first lead 421 is connected with the first electrode 411. The second lead 422 is connected with the second electrode 412.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. A flexible electrothermal composite comprising:

a flexible polymer matrix;

a plurality of carbon nanotubes dispersed in the matrix, the carbon nanotubes cooperatively forming an electrically conductive network in the flexible polymer matrix; and an additive contained in the flexible polymer matrix, the additive being selected from the group consisting of antioxidant and flame retardant;

wherein a percentage of the carbon nanotubes by weight is in the range from 0.1% to 4%.

2. The flexible electrothermal composite as claimed in claim 1, wherein the flexible polymer comprises of a material that is selected from the group consisting of silicone elastomer, polyurethane, and epoxy resin.

3. The flexible electrothermal composite as claimed in claim 1, wherein the carbon nanotubes are single-walled carbon tubes or multi-walled carbon tubes.

4. The flexible electrothermal composite as claimed in claim 1, wherein a length of each of the carbon nanotubes is in the range from 1 micrometer to 10 micrometers.

5. The flexible electrothermal composite as claimed in claim 1, wherein the flame retardant is selected form the group consisting of chloroparaffin, chloro-cycloparaffin, tetrachlorophthalic anhydride, phosphate ester, halogen substituted phosphate ester and any combination thereof.

6. The flexible electrothermal composite as claimed in claim 5, wherein a percentage of the flame retardant by weight is in the range from 1% to 10%.

7. A heating apparatus comprising:

a flexible electrothermal composite comprising a flexible polymer matrix, a plurality of carbon nanotubes dispersed in the matrix, the carbon nanotubes cooperatively forming an electrically conductive network in the flexible polymer matrix;

two leads each having a first end electrically connected with the flexible electrothermal composite and an opposite second end, and a power supply configured for being electrically connected with the second ends of the leads.

8. The heating apparatus as claimed in claim 7, wherein the flexible polymer is selected from the group consisting of silicone elastomer, polyurethane, and epoxy resin.

9. The heating apparatus as claimed in claim 7, wherein a percentage of the carbon nanotubes by weight is in the range from 0.1% to 4%.

10. The heating apparatus as claimed in claim 7, wherein the carbon nanotubes are single-walled carbon tubes or multi-walled carbon tubes.

11. The heating apparatus as claimed in claim 7, wherein a length of each of the carbon nanotubes is in the range from 1 micrometer to 10 micrometers.

12. The heating apparatus as claimed in claim 7, further comprising an additive contained in the flexible polymer matrix, the additive being selected from the group consisting of antioxidant and flame retardant.

13. The heating apparatus as claimed in claim 12, wherein the flame retardant is selected form the group consisting of chloroparaffin, chloro-cycloparaffin, tetrachlorophthalic anhydride, phosphate ester, halogen substituted phosphate ester and any combination thereof.

14. The heating apparatus as claimed in claim 13, wherein a percentage of the flame retardant by weight is in the range from 1% to 10%.

15. A flexible electrothermal composite comprising:

a flexible polymer matrix;

a plurality of carbon nanotubes dispersed in the matrix, the carbon nanotubes cooperatively forming an electrically conductive network in the flexible polymer matrix; and an additive being selected from the group consisting of antioxidant and flame retardant.

16. The flexible electrothermal composite as claimed in claim 15, wherein the flame retardant is selected from the group consisting of chloroparaffin, chloro-cycloparaffin, tetrachlorophthalic anhydride, phosphate ester, halogen substituted phosphate ester and any combination thereof.

17. The flexible electrothermal composite as claimed in claim 15, wherein a percentage of the flame retardant by weight is in the range from 1% to 10%.

18. The flexible electrothermal composite as claimed in claim 15, wherein the flexible polymer is selected from the group consisting of silicone elastomer, polyurethane, and epoxy resin.

* * * * *

UNITED STATES PATENT AND TRADEMARK OFFICE

CERTIFICATE OF CORRECTION

PATENT NO. : 7,642,489 B2
APPLICATION NO. : 11/561356
DATED : January 5, 2010
INVENTOR(S) : Liu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 306 days.

Signed and Sealed this

Twenty-first Day of December, 2010

David J. Kappos
*Director of the United States Patent and Trademark Office*